(12) United States Patent
Sharma

(10) Patent No.: US 10,817,645 B2
(45) Date of Patent: Oct. 27, 2020

(54) VOLTAGE DROP ASSISTED POWER-GRID AUGMENTATION

(71) Applicant: Synopsys, Inc., Mountain View, CA (US)

(72) Inventor: Himanshu Sharma, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/382,129

(22) Filed: Apr. 11, 2019

(65) Prior Publication Data

US 2019/0318057 A1 Oct. 17, 2019

(30) Foreign Application Priority Data

Apr. 13, 2018 (IN) .............................. 201811014100

(51) Int. Cl.

| | | |
|---|---|---|
| *G06F 30/398* | (2020.01) | |
| *G06F 30/392* | (2020.01) | |
| *G06F 30/394* | (2020.01) | |
| *G06F 111/04* | (2020.01) | |
| *G06F 111/20* | (2020.01) | |
| *G06F 119/12* | (2020.01) | |

(52) U.S. Cl.
CPC .......... *G06F 30/398* (2020.01); *G06F 30/392* (2020.01); *G06F 30/394* (2020.01); *G06F 2111/04* (2020.01); *G06F 2111/20* (2020.01); *G06F 2119/12* (2020.01)

(58) Field of Classification Search
CPC .................... H01L 23/544; H01L 2223/54426
USPC ........................................................... 716/51
See application file for complete search history.

(56) References Cited

U.S. PATENT DOCUMENTS

| | | | | |
|---|---|---|---|---|
| 6,675,139 | B1 * | 1/2004 | Jetton ..................... | G06F 30/39 |
| | | | | 703/17 |
| 7,353,490 | B2 * | 4/2008 | Jiang ..................... | G06F 30/394 |
| | | | | 716/109 |
| 2004/0054975 | A1 * | 3/2004 | Yee ...................... | G06F 30/3312 |
| | | | | 716/113 |
| 2004/0054979 | A1 * | 3/2004 | Bobba .................. | G06F 30/367 |
| | | | | 716/111 |
| 2005/0023705 | A1 * | 2/2005 | Campbell ........... | H01L 23/5286 |
| | | | | 257/786 |
| 2014/0058716 | A1 * | 2/2014 | Dentone ................ | G06F 30/18 |
| | | | | 703/18 |
| 2018/0203971 | A1 * | 7/2018 | Vedantam ............. | G06F 30/394 |

* cited by examiner

*Primary Examiner* — Suresh Memula
(74) *Attorney, Agent, or Firm* — Fenwick & West LLP

(57) ABSTRACT

A method for reducing voltage hot spots in a power grid for a circuit design is implemented on a computer system and includes the following steps. The computer system (e.g., an EDA tool) accesses the circuit design. The circuit design includes a power grid that distributes power throughout the circuit design. The computer system identifies spots in the power grid with excessive voltage drops. These will be referred to as hot spots. The power grid is augmented by adding local conductors at the hot spots. These local conductors provide additional electrical paths through the power grid at the hot spots. This in turn reduces the voltage drops at the hot spots.

19 Claims, 8 Drawing Sheets

US 10,817,645 B2

VOLTAGE DROP ASSISTED POWER-GRID AUGMENTATION

CROSS-REFERENCE TO RELATED APPLICATION(S)

This application claims priority to Indian Provisional Patent Application Serial No. 201811014100, "Electronic Structure for Circuit Design, Testing and/or Manufacturing," filed Apr. 13, 2018. The subject matter of all of the foregoing is incorporated herein by reference in their entirety.

BACKGROUND

1. Technical Field

This disclosure relates to power grid augmentation.

2. Description of Related Art

Semiconductor fabrication is a complex technology, which is always moving to technology nodes that use smaller features. For advanced nodes such as 16 nm and smaller technology nodes, the pitch and size of metal lines on the integrated circuit has shrunk and the density between cells has increased to the point that it potentially may cause regions of the integrated circuit with unacceptably high voltage drop across cells. For example, the power grid is a net of distribution lines that distributes power to the components on the integrated circuit. Excessive voltage drops can cause the final delivered voltage to be too low.

Power grid augmentation (PGA) is one approach to address these excessive voltage drops. In one approach to power grid augmentation, metal fill is used to augment the power grid. Metal fill are metal shapes that are added to the integrated circuit design in order to physically fill out the design. Metal fill serves a structural purpose, rather than an electrical one, so metal fill typically is not connected to any of the electrical nets in the integrated circuit. The metal fill is "floating" in an electrical sense. These floating fill shapes are then used to augment the power grid. The floating fill shapes are connected to the power grid by dropping vias at appropriate intersections between the fill shapes and the power grid.

However, over the last couple years, foundries have shifted to a pattern fill approach, which creates floating fill shapes that cannot be easily connected to the power grid by dropping vias. In addition, especially with advanced nodes, adding additional shapes to the electrical net can have a significant impact on timing, and on yield and critical areas.

Thus, there is a need for better approaches to reducing excessive voltage drops in the power grid.

SUMMARY

The present disclosure overcomes the limitations of the prior art by providing a method for reducing voltage hot spots in a power grid for a circuit design. The method is implemented on a computer system and includes the following steps. The computer system (e.g., an EDA tool) accesses the circuit design. The circuit design includes a power grid that distributes power throughout the circuit design. The computer system identifies spots in the power grid with excessive voltage drops. These will be referred to as hot spots. The power grid is augmented by adding local conductors at the hot spots. These local conductors provide additional electrical paths through the power grid at the hot spots. This in turn reduces the voltage drops at the hot spots.

The design of the added local conductors, for example their size, shape, lateral location on the die and/or metal layer, may be determined taking into account factors such as their effects on reducing resistance through the hot spot, on manufacturing yield or critical area (area of the die where a fault during fabrication leads to device failure), and/or on timing of signals propagating through the circuit.

In one approach, the local conductors include straps and shunts. Straps are metal lines that extend existing lines in the original power grid. Shunts are additional metal lines that are not extensions of the original power grid. For example, shunts may be used to electrically connect different lines in the original power grid (or their extensions) and/or other shunts. Vias are used to connect lines in different metal layers.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
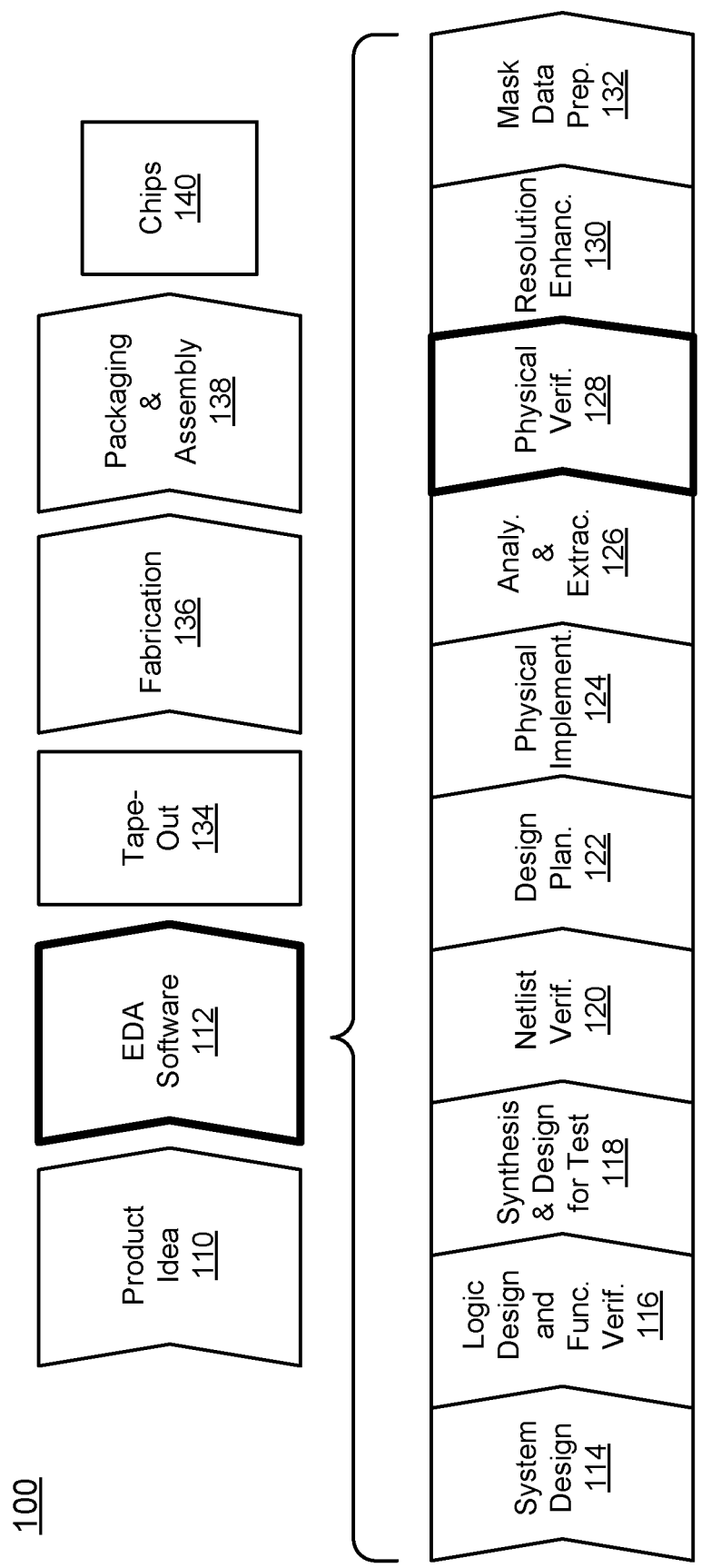
FIG. 1 is a flow diagram illustrating various operations in the design and fabrication of an integrated circuit.

For context, FIG. 1 illustrates various processes performed in the design and fabrication of an integrated circuit using software tools with a computer to transform data and instructions that represent the integrated circuit. These processes start with the generation of a product idea 110 with information supplied by a designer and is realized during a design process that uses electronic design automation (EDA) software tools 112, which may also be signified herein as EDA software, as a design tool or a verification tool. When the design is finalized, it is taped-out 134. After tape-out, a semiconductor die is fabricated 136 and packaging and assembly processes 138 are performed, which result in the finished integrated circuit 140 which may also be signified herein as a circuit, device, component, chip or SoC (system on chip).

Note that the design process that uses EDA software tools 112 includes operations 114-132, which are described below. This design flow description is for illustration purposes only and is not meant to limit the present disclosure. For example, in an actual integrated circuit design, the designer may not perform all of the design operations shown, may perform additional design operations, and/or may perform the design operations in a different sequence than the sequence described herein.

During system design 114, a designer describes the functionality to be manufactured. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products.

During logic design and functional verification 116, VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

During synthesis and design for test 118, VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification 120, the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products.

In design planning 122, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

Additionally, during physical implementation 124, the placement positioning of circuit elements such as transistors or capacitors and routing connection of the same by a plurality of conductors occurs. Exemplary EDA software products from Synopsys, Inc. of Mountain View, Calif. that can be used at this stage include: the Astro and IC Compiler products.

During analysis and extraction 126, the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products.

During physical verification 128, the design is checked to ensure correctness for manufacturing issues, electrical issues, lithographic issues, and circuitry. Exemplary EDA software products from Synopsys, Inc. of Mountain View, Calif. that can be used at this stage include the Hercules product.

In resolution enhancement 130, geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation 132, the "tape-out" data for production of masks to produce finished integrated circuits is provided. Exemplary EDA software products from Synopsys, Inc. of Mountain View, Calif. that can be used at this stage include the CATS family of products.

For all of the above mentioned integrated circuit design tools, similar tools from other EDA vendors, such as Cadence and Mentor Graphics, can be used as an alternative. Additionally, similarly non-commercial tools available from universities can be used.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Embodiments of the present disclosure can be used during one or more of the above-described stages. For example, some embodiments of the present disclosure can be used in EDA software 112 as a part of physical verification 128. It may also be used in physical implementation 124.

Figure 2:
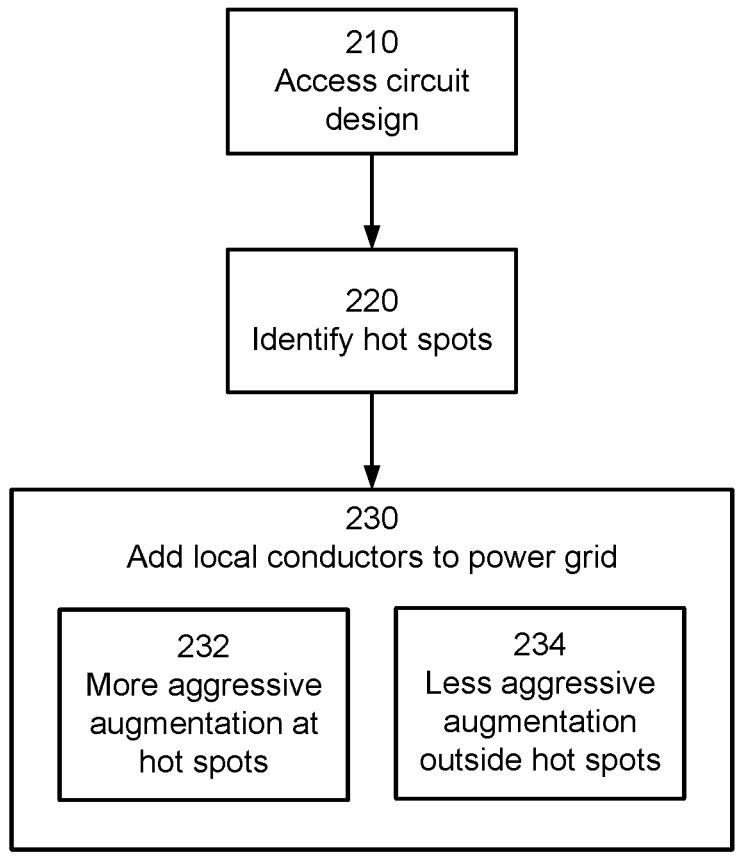
FIG. 2 is a flow diagram illustrating a process for power grid augmentation.

FIG. 2 is a flow diagram illustrating a process (flow) for power grid augmentation. This flow is implemented on a computer system, for example using an EDA tool or set of EDA tools. After the post-route stage, the computer system accesses 210 the circuit design which includes the layout of the power grid. This is typically a gate-level netlist plus physical layout. The computer system (e.g., a place and route tool, such as Synopsys' ICC2) identifies 220 hot spots in the power grid. These are spots with excessive voltage drops.

Hot spots may be identified using different criteria. For example, hot spots may be identified based on voltage drop data for the ground net for the power grid, or for the power net for the power grid. Hot spots may also be identified based on the voltage drop across cells. Either static or dynamic voltage drop may be used. The criteria used may be based on actual volts or on a percentage of the supply voltage.

The computer system identifies available routing resources and uses them to create "additional" conductors that are connected to the existing power grid. Because this augmentation 230 of the power grid occurs later in the design flow, the additional conductors typically will be localized to the vicinity of the hot spot. For example, they will not be tracks that run the entire length of the die. These local conductors provide additional electrical paths through the power grid, reducing the effective resistance of the power grid and thus reducing the voltage drop at the hot spots.

Generally, we want to add local conductors in order to reduce the voltage drop. However, adding local conductors can have other undesirable effects, such as impacts on timing, yield and critical area. For example, adding local conductors can add capacitance or capacitive coupling to nets, which affects timing. It can also decrease yield or increase the size of the critical area. Thus, we want to maximize the decrease in resistance while minimizing these other undesirable effects.

In one approach, these effects are balanced as follows. The computer system identifies 220 hot spots. Power grid augmentation 230 is different at the hot spots than outside the hot spots. For example, it may be more aggressive 232 in the hot spot areas and less aggressive 234 outside the hot spot areas. In one approach, outside the hot spot area, the power grid may be augmented with additional local conductors only if there is no or minimal degradation in timing and critical area. A more balanced approach may be taking within the hot spot area, making tradeoffs between reducing the power grid resistance while adversely impacting the timing or critical area. Timing analysis tools such as Synopsys' Prime-Time or ICC2 tool may be used for timing calculations. ICC2 may also be used to identify critical areas.

The power grid augmentation 230 may be timing-aware. That is, the effect on timing is one factor used to determine the design of local conductors to be added. In one approach, the flow protects clocks and timing critical nets by not placing any additional conductors near them, thus reducing the timing impact. Where timing effects cannot be avoided, it is generally desirable to select local conductors that have a maximum impact on reducing resistance while having a minimum impact on timing.

The approach shown in FIG. 2 can be especially useful at more advanced technology nodes, such as 16 nm and smaller, or even 7 nm and smaller. At these smaller geometries, the conductors are also narrower, sometimes even requiring double patterning to create. As a result, voltage hot spots can become more prevalent.

FIGS. 3A-3E are physical layouts of the ground net for a power grid, illustrating one approach to adding local conductors. For simplicity, only augmentation of the ground side of the power grid is shown.

Figure 3A:
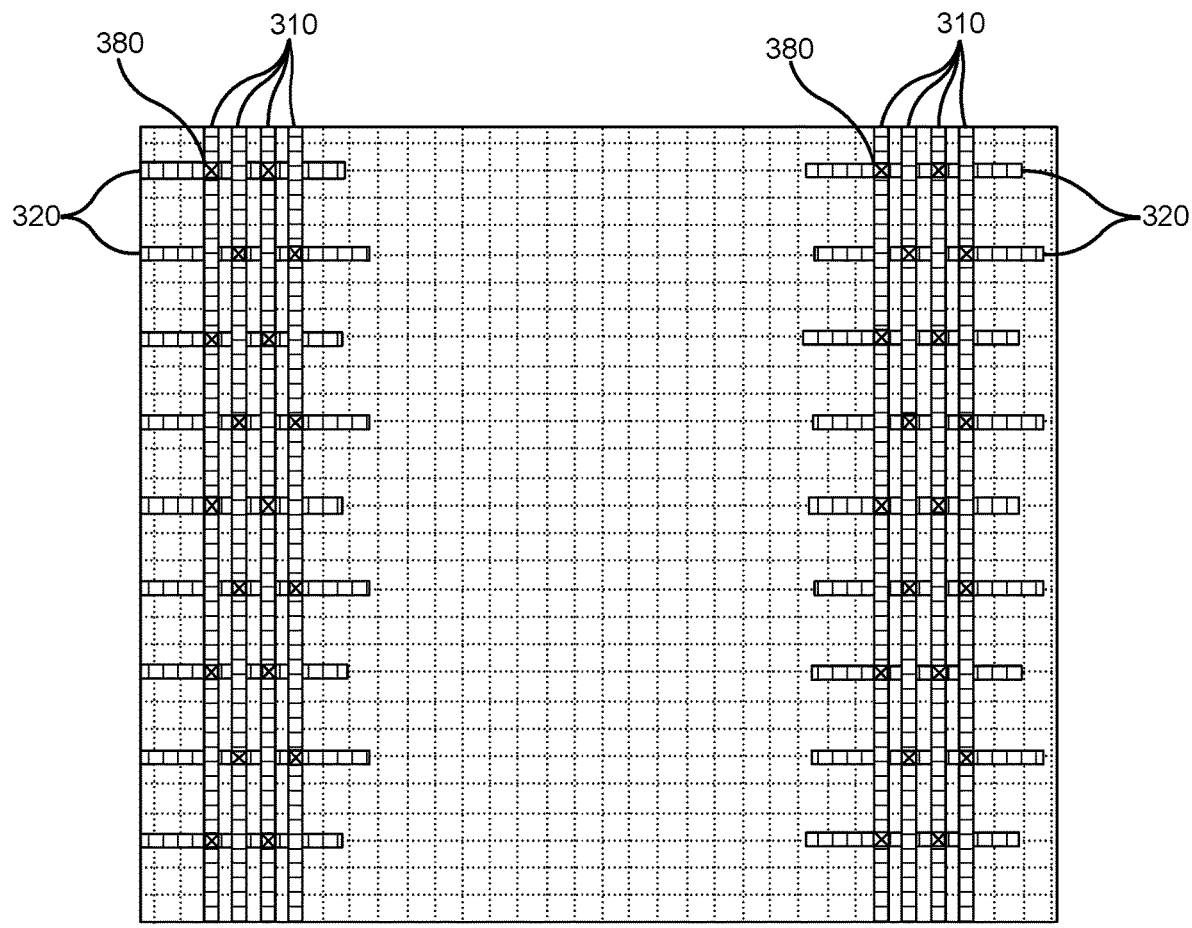
FIGS. 3A-3E are physical layouts of the ground net for a power grid, illustrating an example of the process of FIG. 2.

FIG. 3A shows the layout of the original power grid before augmentation. In this example, the power grid is laid out on a Manhattan geometry with metal lines running only "horizontally" and "vertically," so that all intersections are at ninety degrees. In addition, the metal lines are laid out on tracks. That is, the metal lines are restricted to a grid with a specific pitch. The tracks are shown in FIG. 3A as a grid of dotted lines, but this grid is omitted for clarity in the remaining figures. The cross-hatching is indicative of the metal layer. All horizontally cross-hatched rectangles are in one metal layer, vertically cross hatched rectangles are another metal layer and, in later figures, diagonally cross-hatched rectangles are a third metal layer. The squares with X's are vias 380. The original power grid shown in FIG. 3A has primary distribution lines 310 that run vertically for a longer length and shorter secondary distribution lines 320 that are electrically connected to and run perpendicular to the primary distribution lines. The power grid follows a regular pattern.

Figure 3B:
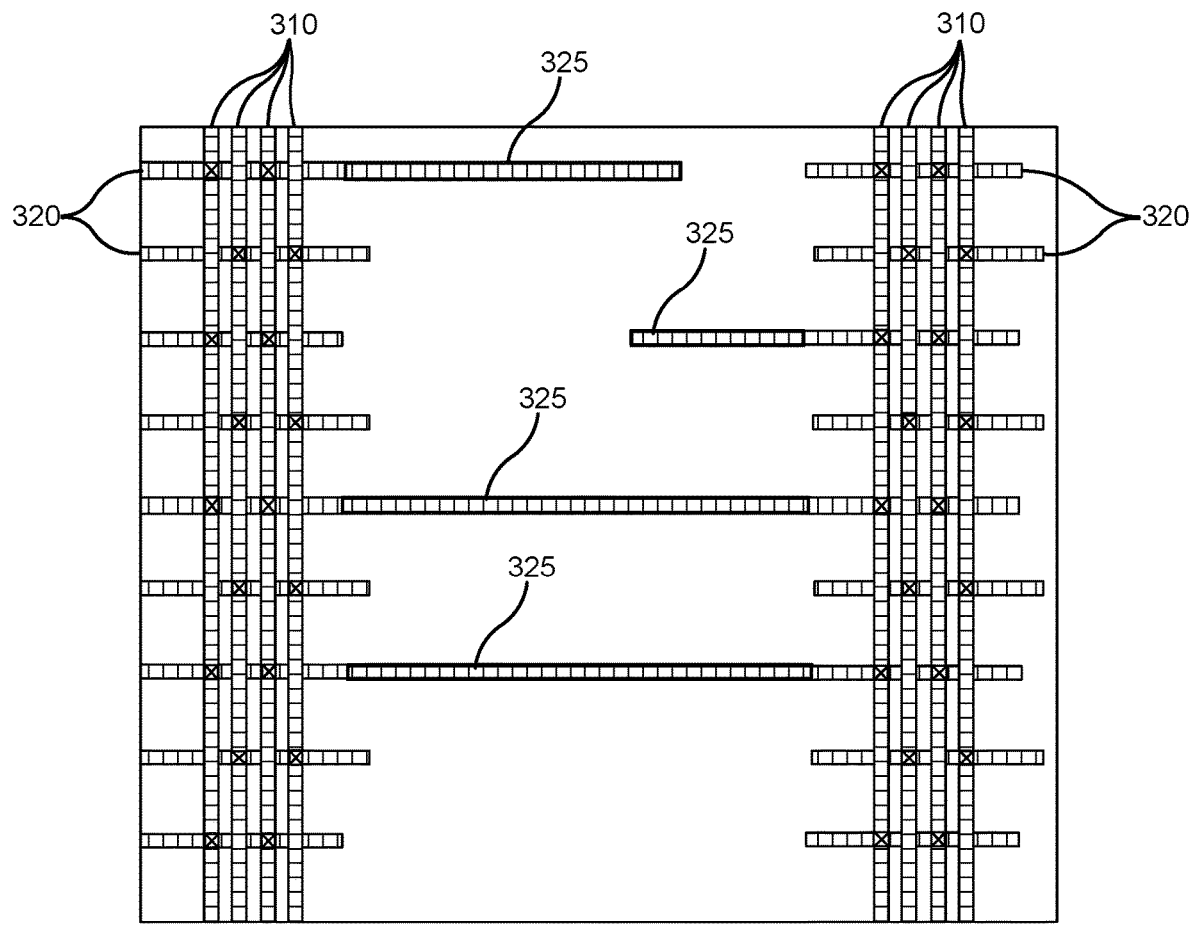

FIGS. 3B-3E shows augmentation of the original power grid with additional metal lines. In FIG. 3B, the existing distribution lines are opportunistically extended. Here, some of the secondary distribution lines 320 are extended by metal lines on the same metal layer, which will be referred to as straps 325. In these figures, the original power grid 310, 320 is shown as rectangles with a thinner border, while the metal lines 325 used to augment the power grid are shown with a thicker border. The primary distribution lines 310 already run the entire length of the area shown so no straps are added to those.

Figure 3C:
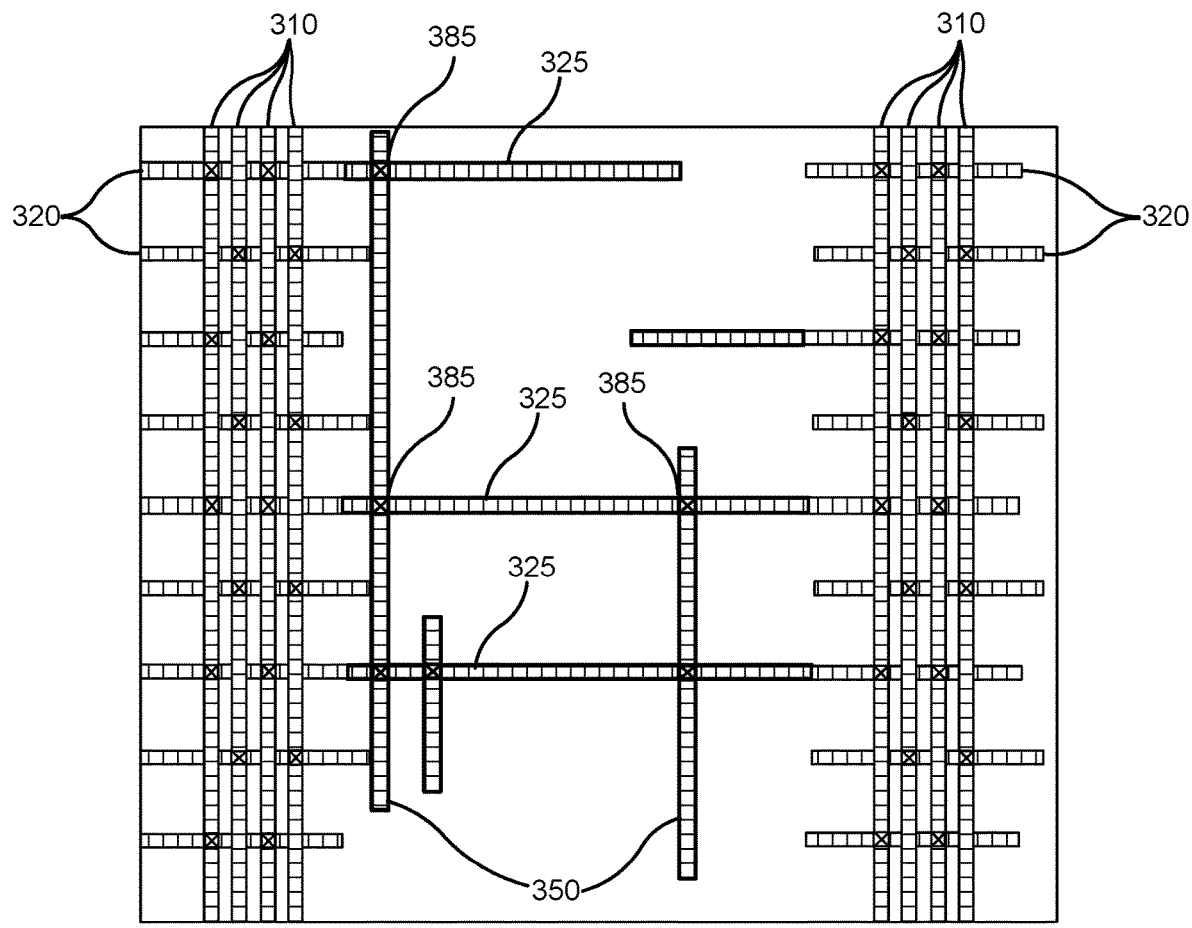
Figure 3D:
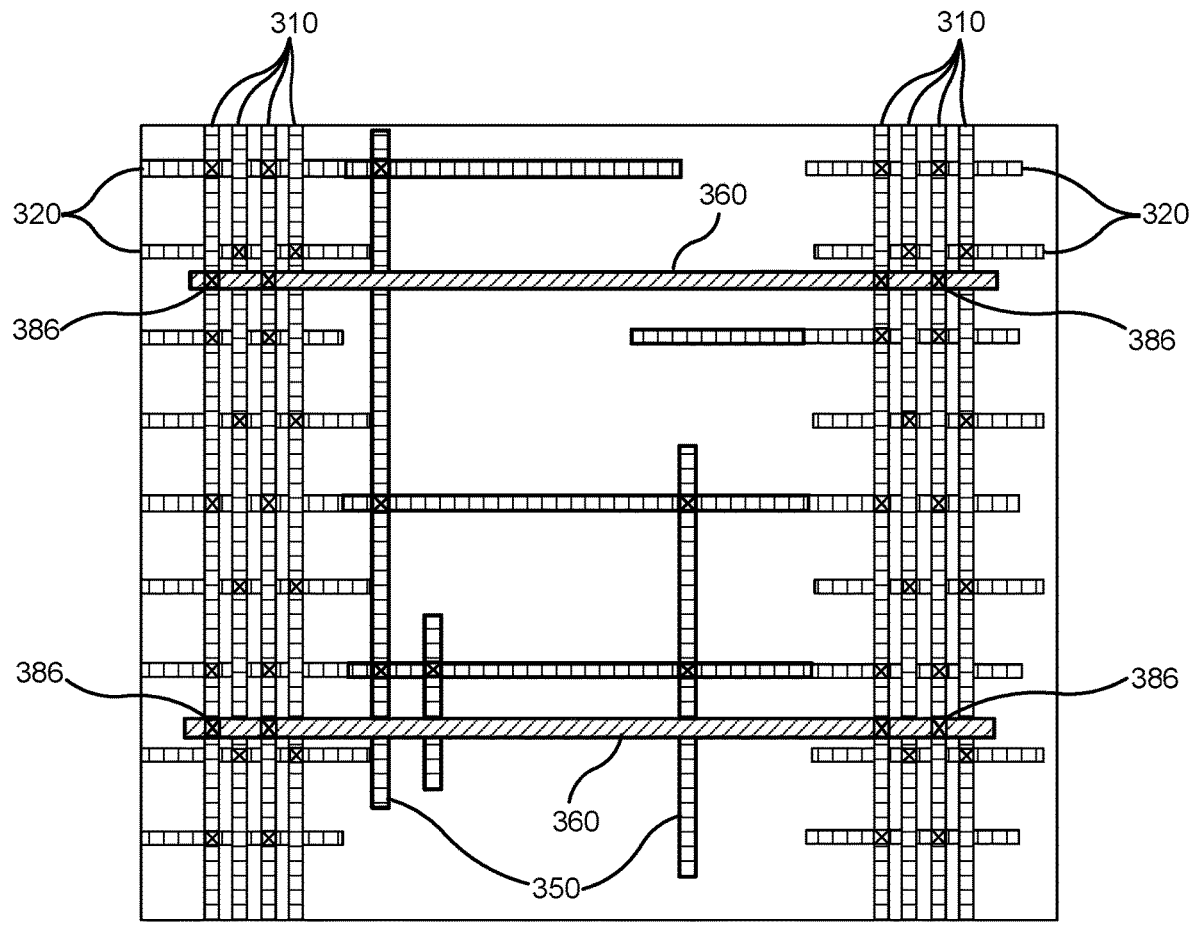
Figure 3E:
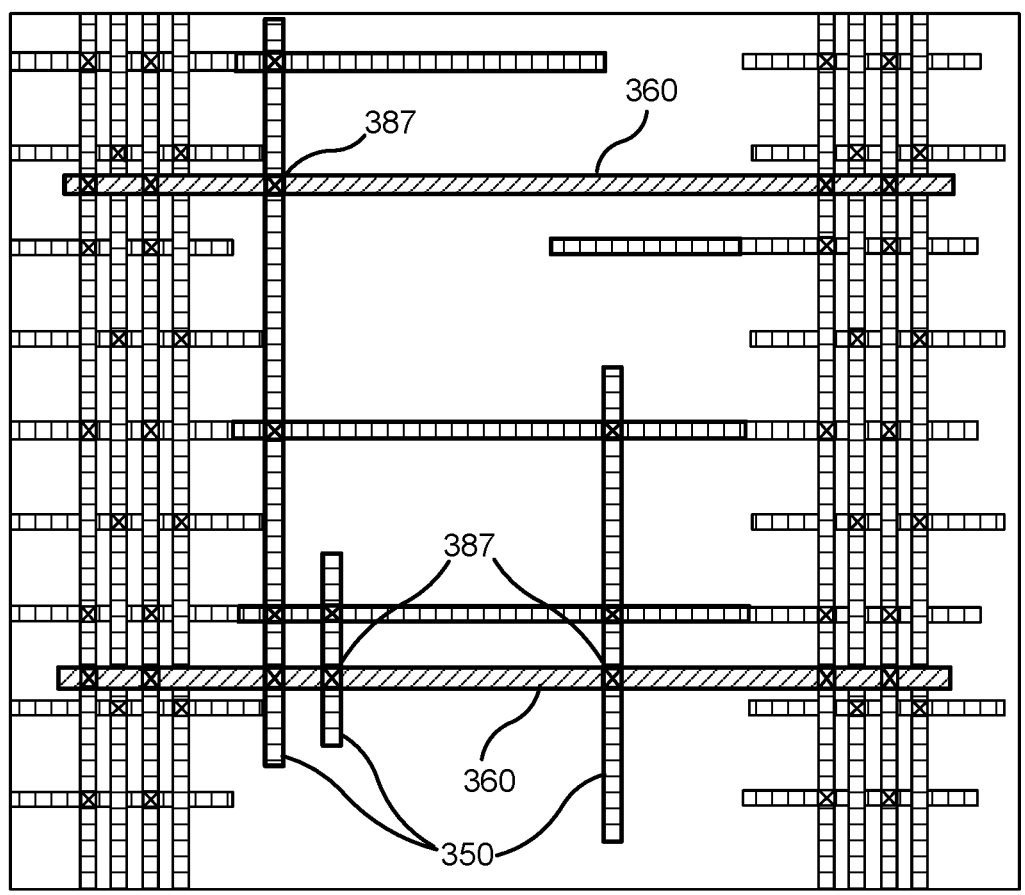

FIGS. 3C-3D show the addition of shunts 350, 360. Shunts are shorter metal lines that are not part of the original power grid or extensions of the original power grid. Shunts are usually used to electrically connect different distribution lines and/or their straps. FIG. 3C shows vertical shunts 350, which are used to electrically connect the horizontal distribution lines 320 and/or their straps 325. FIG. 3C also shows vias 385 connecting the different metal layers 325, 350. FIG. 3D shows horizontal shunts 360, which are used to electrically connect the vertical distribution lines 310. FIG. 3D also shows the vias 386 connecting the horizontal shunts 360 to the vertical distribution lines 310. FIG. 3E shows the vias 387 connecting vertical and horizontal shunts 350, 360.

If the original power grid 310, 320 is laid out on certain metal layers, the shunts 350, 360 preferably are on the same metal layers or on metal layers between the layers of the original power grid. It is also possible for shunts to be routed on metal layers that are outside of the layers for the original power grid.

Figure 4:
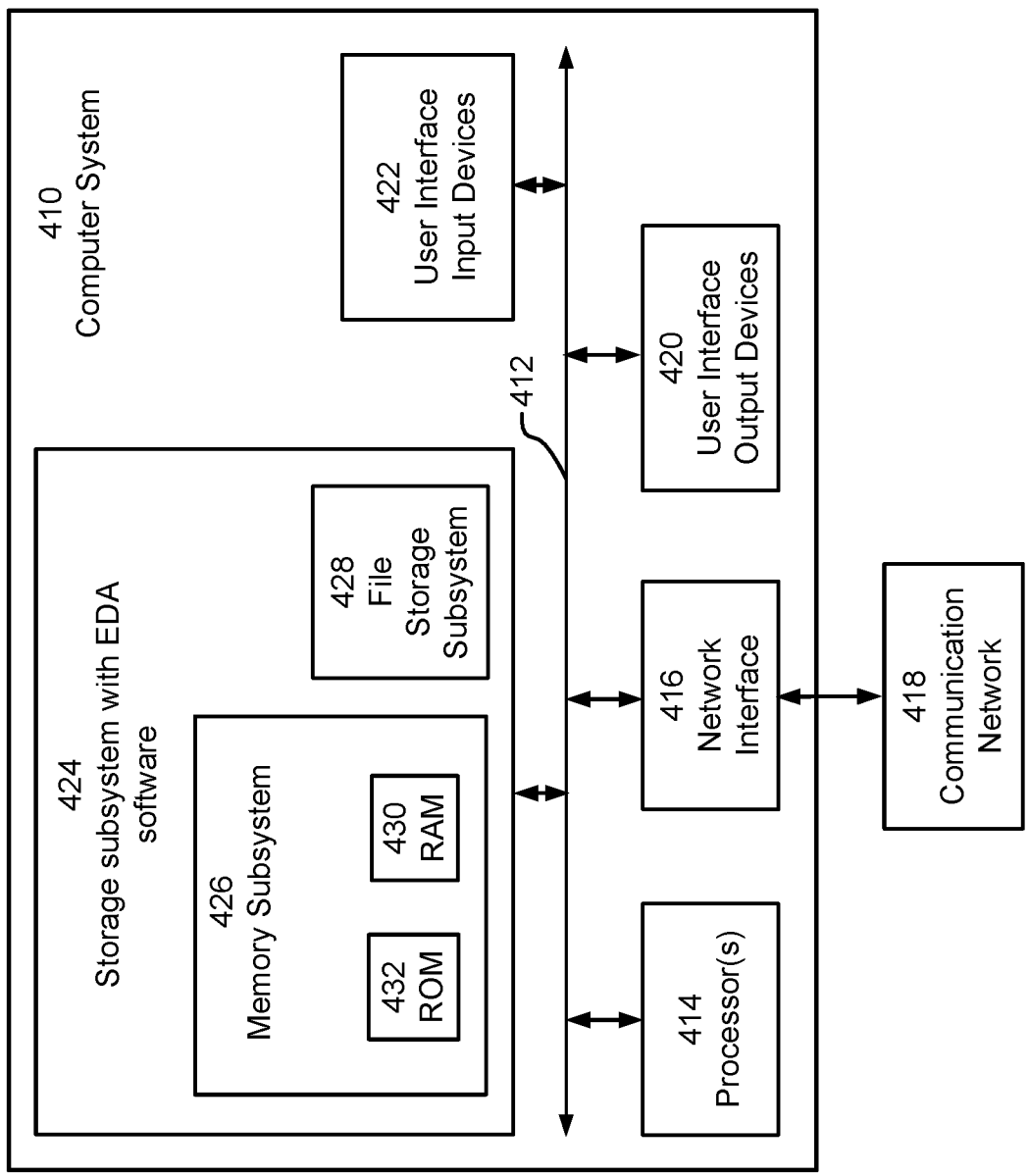
FIG. 4 is a block diagram of one embodiment of a computer system that may be used with the present invention.

FIG. 4 is a block diagram of one embodiment of a computer system 410 that may be used with the present invention. The computer system 410 typically includes at least one computer or processor 414 which communicates with a number of peripheral devices via bus subsystem 412. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms "processor" and "computer" are further defined below. These peripheral devices may include a storage subsystem 424, comprising a memory subsystem 426 and a file storage subsystem 428, user interface input devices 422, user interface output devices 420, and a network interface subsystem 416. The input and output devices allow user interaction with computer system 410.

The computer system may be a server computer, a client computer, a workstation, a mainframe, a personal computer (PC), a tablet PC, a rack-mounted "blade" or any data processing machine capable of executing instructions (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term "processor" here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions to perform any one or more of the operations discussed herein. Due to the ever-changing nature of computers and networks, the description of computer system 410 depicted in FIG. 4 is intended only as one example for purposes of illustrating the preferred embodiments. Many other configurations of computer system 410 are possible having more or less components than the computer system depicted in FIG. 4.

Network interface subsystem 416 provides an interface to outside networks, including an interface to communication network 418, and is coupled via communication network 418 to corresponding interface devices in other computer systems or machines. Communication network 418 may comprise many interconnected computer systems, machines and communication links. These communication links may be wireline links, optical links, wireless links, or any other devices for communication of information. Communication network 418 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 422 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 410 or onto communication network 418. User interface input devices typically allow a user to select objects, icons, text and the like that appear on some types of user interface output devices, for example, a display subsystem.

User interface output devices 420 may include a display subsystem, a printer, or non-visual displays such as audio output devices. The display subsystem may include a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 410 to the user or to another machine or computer system.

Memory subsystem 426 typically includes a number of memories including a main random-access memory (RAM) 430 (or other volatile storage device) for storage of instructions and data during program execution and a read only memory (ROM) 432 in which fixed instructions are stored. File storage subsystem 428 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 428.

Bus subsystem 412 provides a device for letting the various components and subsystems of computer system 410 communicate with each other as intended. Although bus subsystem 412 is shown schematically as a single bus, alternative embodiments of the bus subsystem may use multiple busses. For example, RAM-based main memory can communicate directly with file storage systems using Direct Memory Access (DMA) systems.

As used herein, the term "module" signifies a tangible data and information processing device, that typically is limited in size and/or complexity. For example, the term "module" can signify one or more methods or procedures that can transform data and information. The term "module" can also signify a combination of one or more methods and procedures in a computer program. The term "module" can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Inters Altera), Random Access Memories (RAMs) or microprocessors. A module is configured to process data and information, typically using a sequence transformations (also referred to as "operations") applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a process comprising a sequence or set of operations or instructions that a module can use to transform data and information to achieve a result. A module can comprise one or more algorithms. As used herein, the term "thread" refers to a sequence of instructions that can comprise a subset of the instructions of an entire process or algorithm. A process or algorithm can be partitioned into multiple threads that can be executed in parallel.

As used herein, the term "computer" includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term "software" or "program" signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method implemented on a computer system, the computer system executing instructions to carry out a method for reducing voltage hot spots in a power grid for a circuit design, the method comprising:
    accessing a circuit design, the circuit design comprising a power grid that distributes power throughout the circuit design;
    identifying hot spots in the power grid with voltage drops; and
    augmenting the power grid by adding local conductors at the hot spots, the local conductors providing additional electrical paths through the power grid at the hot spots, thereby reducing the voltage drops at the hot spots, wherein the power grid before augmentation comprises a plurality of distribution lines and the local conductors include straps that extend a length of some of the distribution lines.

2. The computer-implemented method of claim 1 wherein identifying hot spots is based on at least one of voltage drops for a ground net of the power grid, voltage drops for a power net of the power grid, or voltage drops across cells in the circuit design.

3. The computer-implemented method of claim 1 further comprising:
    augmenting the power grid by also adding local conductors outside the hot spots, but where the power grid is more aggressively augmented at the hot spots than outside the hot spots.

4. The computer-implemented method of claim 1 wherein a design of the added local conductors is determined based in part on an effect of the local conductor on a resistance through the power grid.

5. The computer-implemented method of claim 1 wherein a design of the added local conductors is determined based in part on an effect of the local conductor on a yield of the circuit design.

6. The computer-implemented method of claim 1 wherein a design of the added local conductors is determined based in part on an effect of the local conductor on a critical area for the circuit design.

7. The computer-implemented method of claim 1 wherein a design of the added local conductors is determined based in part on an effect of the local conductor on a timing of signals through the circuit design.

8. The computer-implemented method of claim 1 further comprising:
    identifying timing-critical nets, wherein a design of the added local conductors is determined based in part on a location of the timing-critical nets.

9. The computer-implemented method of claim 1 wherein the power grid before augmentation follows a regular pattern.

10. The computer-implemented method of claim 1 wherein the power grid and the local conductors are laid out on a Manhattan geometry, and the distribution lines before augmentation comprise a plurality of parallel primary distribution lines electrically connected to a plurality of secondary distribution lines that are perpendicular to the primary distribution lines.

11. The computer-implemented method of claim 10 wherein the local conductors further include shunts that electrically connect different distribution lines and/or straps.

12. The computer-implemented method of claim 11 wherein the local conductors further include shunts that electrically connect different shunts and/or straps.

13. The computer-implemented method of claim 1 wherein the circuit design is for a 16 nm or smaller technology node.

14. The computer-implemented method of claim 1 wherein the circuit design is laid out using double patterning.

15. A non-transitory computer-readable storage medium storing executable computer program instructions for reducing voltage hot spots in a power grid for a circuit design, the instructions executable by a computer system and causing the computer system to perform a method comprising:
    accessing a circuit design, the circuit design comprising a power grid that distributes power throughout the circuit design;
    identifying hot spots in the power grid with voltage drops; and augmenting the power grid by adding local conductors at the hot spots, the local conductors providing additional electrical paths through the power grid at the hot spots, thereby reducing the voltage drops at the hot spots, wherein the power grid before augmentation comprises a plurality of distribution lines and the local conductors include straps that extend a length of some of the distribution lines.

16. An electronic design automation (EDA) system for reducing voltage hot spots in a power grid for a circuit design, comprising:
   a data store that stores a circuit design, the circuit design comprising a power grid that distributes power throughout the circuit design; and
   an EDA tool suite in communication with the data store, the EDA tool suite configured to:
      identify hot spots in the power grid with voltage drops; and
      augment the power grid by adding local conductors at the hot spots, the local conductors providing additional electrical paths through the power grid at the hot spots, thereby reducing the voltage drops at the hot spots, wherein the power grid before augmentation comprises a plurality of distribution lines and the local conductors include straps that extend a length of some of the distribution lines.

17. The EDA system of claim 16 wherein the EDA tool suite includes a place and route tool that identifies the hot spots in the power grid.

18. The EDA system of claim 17 wherein the EDA tool suite includes a separate EDA tool that augments the power grid by adding local conductors both at the hot spots and outside the hot spots, but that augments the power grid more aggressively at the hot spots than outside the hot spots.

19. The EDA system of claim 17 wherein the EDA tool suite includes a timing analysis tool that determines timing of signals through the circuit design, and the EDA tool suite adds local conductors based in part on an effect of the local conductor on the timing of signals through the circuit design.

* * * * *